(12) United States Patent
Guertler et al.

(10) Patent No.: US 9,086,932 B2
(45) Date of Patent: Jul. 21, 2015

(54) SYSTEM LANDSCAPE AWARE INTER-APPLICATION COMMUNICATION INFRASTRUCTURE

(75) Inventors: Jochen Guertler, Karlsruhe (DE); Yahali Sherman, Walldorf (DE); Ariel Tammam, Walldorf (DE)

(73) Assignee: SAP SE, Walldorf (DE)

( * ) Notice: Subject to any disclaimer, the term of this patent is extended or adjusted under 35 U.S.C. 154(b) by 752 days.

(21) Appl. No.: 12/579,199

(22) Filed: Oct. 14, 2009

(65) Prior Publication Data

US 2011/0088046 A1 Apr. 14, 2011

(51) Int. Cl.
 G06F 9/54 (2006.01)
 G06F 9/46 (2006.01)
 G06F 3/00 (2006.01)
 G06F 13/00 (2006.01)

(52) U.S. Cl.
 CPC .......................................... G06F 9/54 (2013.01)

(58) Field of Classification Search
 CPC ........................................................ G06F 9/54
 See application file for complete search history.

(56) References Cited

U.S. PATENT DOCUMENTS

| 2004/0068714 | A1 | 4/2004 | Deimel et al. | |
| 2004/0111533 | A1 | 6/2004 | Beisiegel et al. | |
| 2006/0136600 | A1 | 6/2006 | Holdsworth | |
| 2008/0021754 | A1* | 1/2008 | Horn et al. | 705/8 |

FOREIGN PATENT DOCUMENTS

| CN | 1333342 C | 1/2002 |
| CN | 1816050 | 8/2006 |
| CN | 101202794 | 6/2008 |
| JP | 2008/040722 | 2/2008 |

OTHER PUBLICATIONS

SAP Exchange Infrastructure (SAP XI); http://searchsap.techtarget.com/definition/SAP-Exchange-Infrastructure; 1 page; Sep. 24, 2004.*
William Li and Joachim Orb; Session ID: XI302 SAP Exchange Infrastructure—Graphical Mapping—Advanced; SAP TechEd '04; 2004; http://scn.sap.com/docs/DOC-22620; 55 pages.*
Extended European Search Report issued in corresponding European Application No. 10010380.3 on Jun. 15, 2011; 9 pages.

(Continued)

*Primary Examiner* — H S Sough
*Assistant Examiner* — Kimberly Jordan
(74) *Attorney, Agent, or Firm* — Fish & Richardson P.C.

(57) ABSTRACT

This disclosure relates to systems, methods, and software that involve system landscape aware inter-application communication infrastructure. This inter-application communication infrastructure may implement one metamodel to describe how an application could participate in an inter-application communication. The metamodel can describe the input parameters accepted but the application and the possible output of it. Based on the metadata, which would be exposed or otherwise available for involved applications, there is a protocol defining the communication flows between applications.

20 Claims, 5 Drawing Sheets

(56) References Cited

OTHER PUBLICATIONS

Karastoyanova et al.; "Semantic Service Bus: Architecture and Implementation of a Next Generation Middleware"; Data Engineering Workshop; 2007 IEEE; Apr. 1, 2007; pp. 347-354.
Leymann F. et al.; "Web Services and Business Process Management"; IBM Systems Journal; IBm Corp; vol. 41, No. 2; Jan. 1, 2002; pp. 198-211.
Kreger, H. et al.; "Web Services Conceptual Architecture"; IBM Technical Report Series; May 1, 2001; pp. 1-42.
Communication Pursuant to Article 94(3) EPC issued European Application No. 10010380.3 on Feb. 7, 2012; 7 pages.
Office Action for JP application No. 2010-230457 dated Mar. 26, 2013 with English translation; 3 pages.
Office Action for CN application No. 2010-105062097 dated Oct. 25, 2013 with English translation; 13 pages.

* cited by examiner

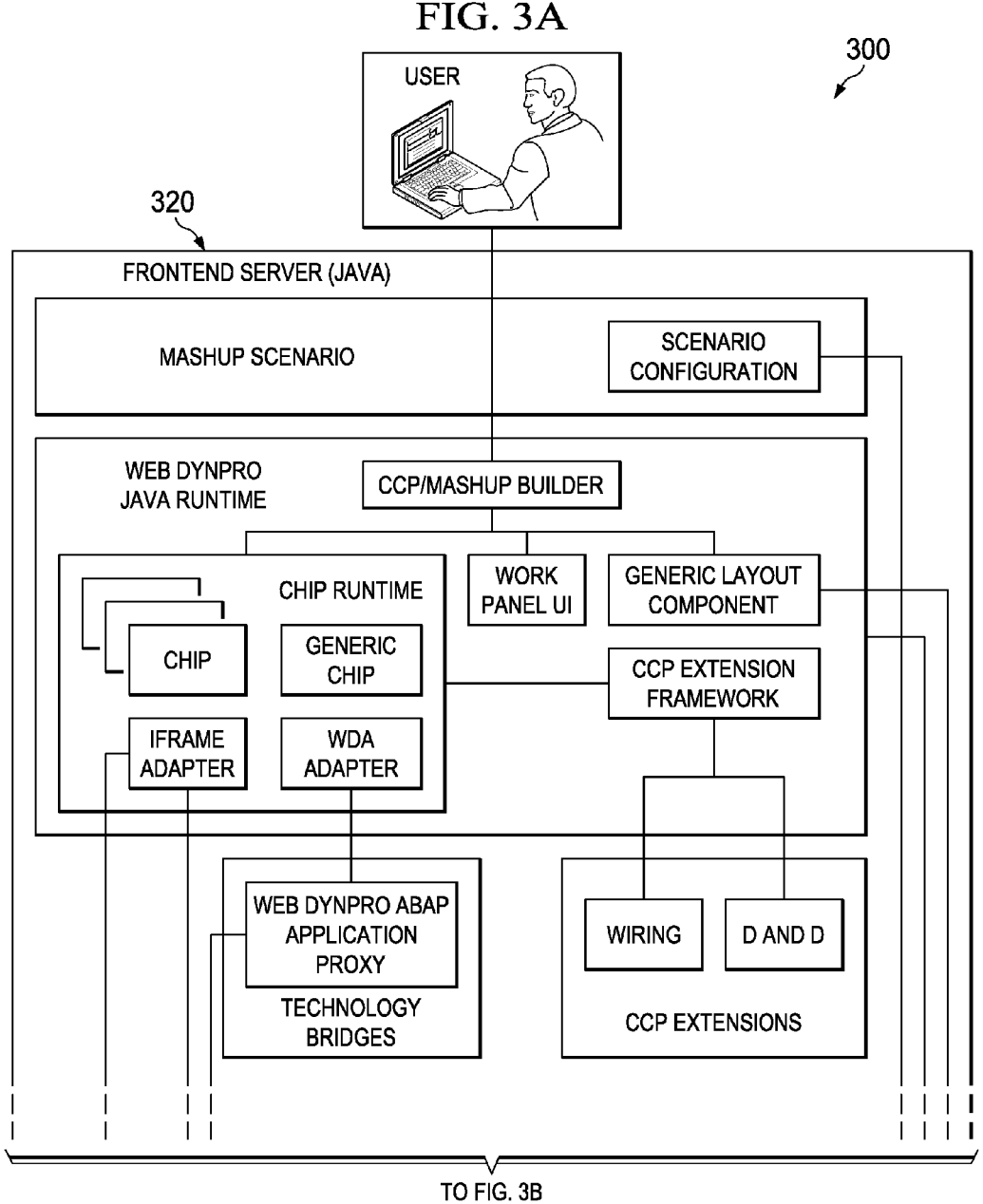

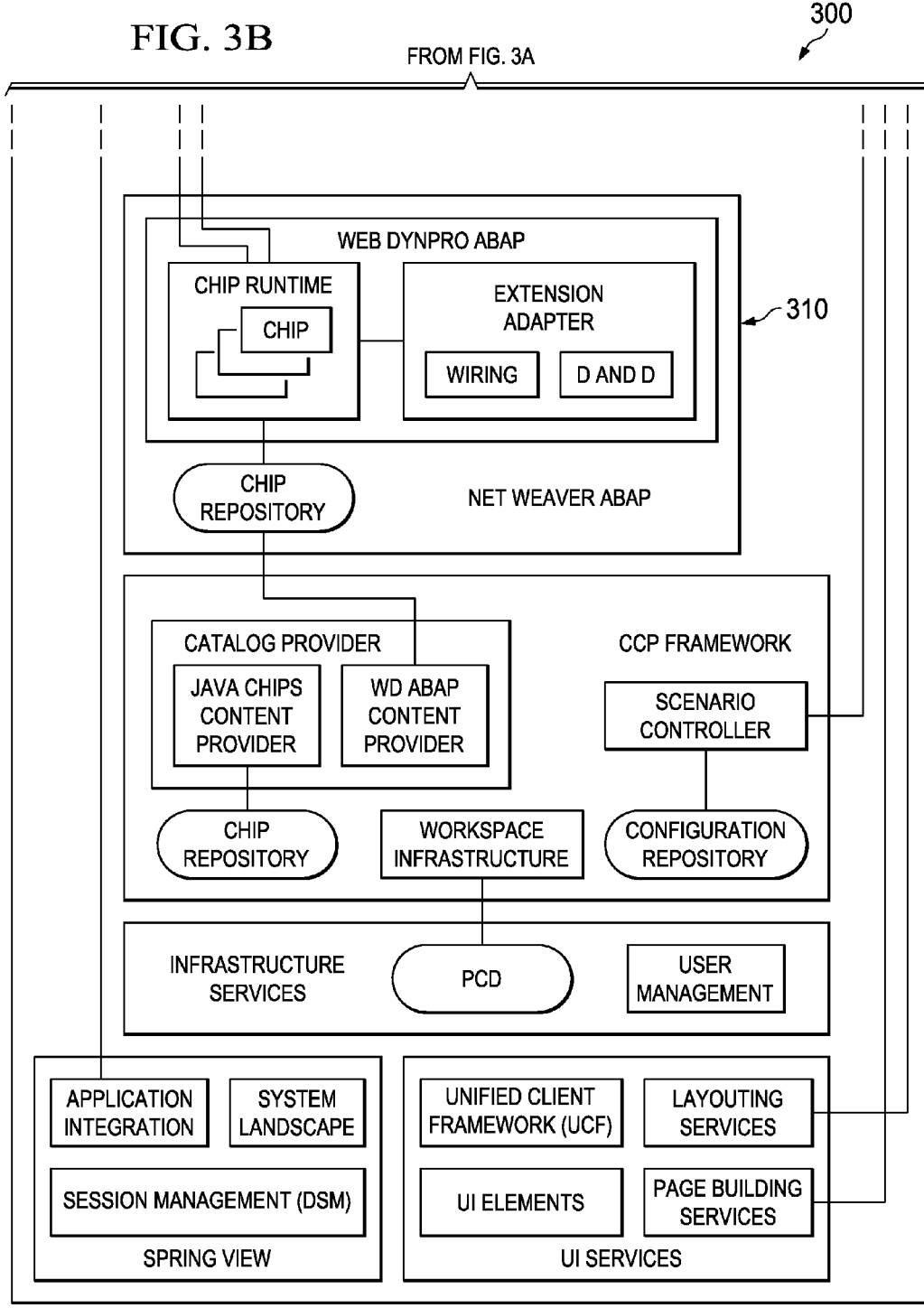

SYSTEM LANDSCAPE AWARE INTER-APPLICATION COMMUNICATION INFRASTRUCTURE

TECHNICAL FIELD

This disclosure relates to systems, methods, and software that involve system landscape aware inter-application communication infrastructure. Particularly, the present disclosure includes creating or using one meta model (consistently used in various involved applications) to describe how an application or other program could participate in inter-application communication.

BACKGROUND

Computer programs, which may also be referred to as an application (such as a business application), operate within an operating environment. In some instances, operating environments are computer operating systems, such as Microsoft Windows, by Microsoft Corporation of 1020 102nd Ave NE Bellevue, WA 98004. In some instances, the operating environment provides essential or necessary as well as optional operability or features available to one or more applications running in the operating environment. Typically, the features of an operating environment are known in advance, and the application is constructed or otherwise configured based on this advance information. That is, the application is specifically built based on the features known to be provided by the operating environment. More specifically, there is typically software installed from different vendors, in different versions and using different technologies. Even for landscapes that involve a single vendor, the business may have a wide range of different versions of the different products running at (and even these single-vendor products may be based on different technologies, languages, protocols, or messaging structures). Thus, there is a static relationship, even when implemented through dynamically linked libraries, between various applications and the operating environment.

SUMMARY

An aspect of the present disclosure is directed to a landscape aware inter-application communication infrastructure. For example, a computer program product for communicating via a landscape aware inter-application communication infrastructure comprises a tangible storage medium storing computer-readable instructions. In one instance, the instructions are operable to collect information stored in memory for communication to a heterogeneous application and then to generate a message targeted for the heterogeneous application using, at least in part, the collected information. The computer program product communicates the message to a inter-application communication infrastructure for subsequent transmission to the heterogeneous application. Here, the inter-application communication infrastructure is capable of identifying the communication structure for the heterogeneous application and translating the message based on this identified structure.

In another instance, the inter-application communication infrastructure receives a message from a first heterogeneous application, with the message targeted for a second heterogeneous application. The instructions in this computer program product are operable to dynamically identify a stored communication structure for the second heterogeneous application, with the communication structure exposed by the second heterogeneous application. The inter-application communication infrastructure translates the message into a message compatible with the second heterogeneous application based on this identified structure and then communicates the translated message to the second heterogeneous application for processing.

Various embodiments may implement or utilize one or more of the following features. Specifically, the communication structure may store available inputs and outputs for the heterogeneous application. In another example, the communication structure may store available in ports and out ports for the heterogeneous application. In a further example, the communication structure may store data type, cardinality, and a mandatory for each parameter of a particular message. In yet another example, the communication structure may be an exposed file separated from the heterogeneous application, where the exposed file is an XML file.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3A and 3B are example mash-up configurations in accordance with one implementation of the present disclosure.

DETAILED DESCRIPTION

Figure 1:
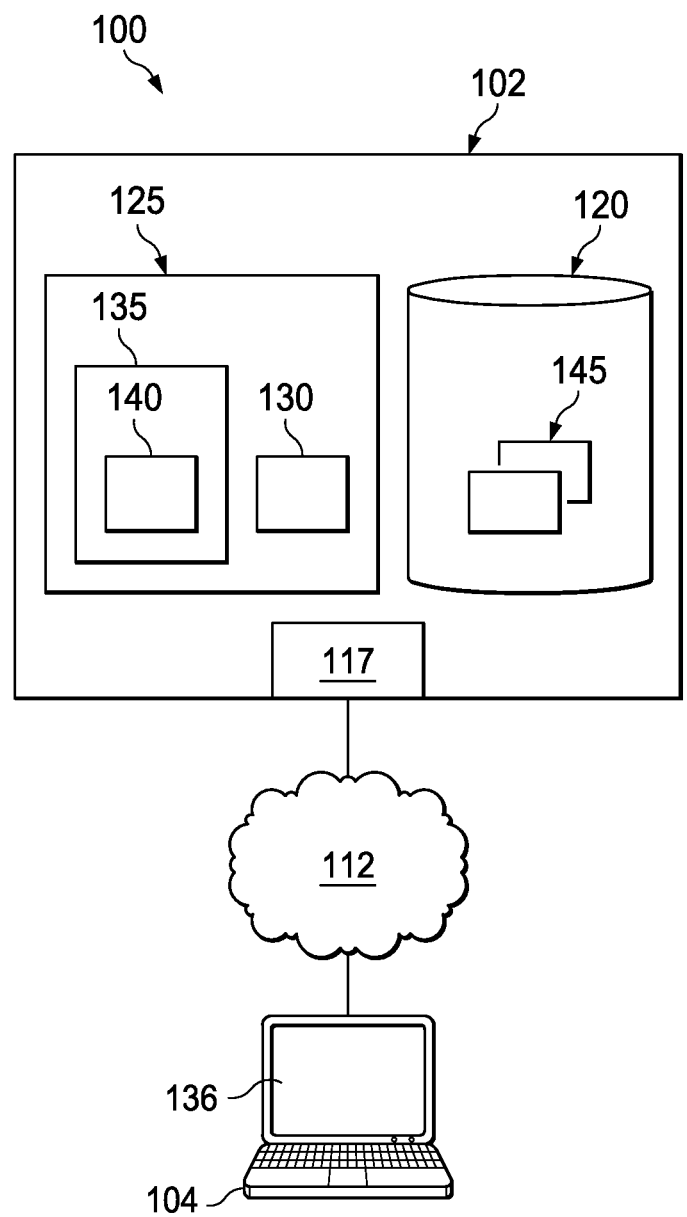
FIG. 1 illustrates an example system communicating via a landscape aware inter-application communication infrastructure in accordance with one implementation of the present disclosure.

An aspect of the present disclosure is directed to a landscape aware inter-application communication infrastructure. In certain configurations, this infrastructure is not restricted to a client-side or server-side approach, is not restricted to a certain system landscape, and is not restricted to any specific UI technology. More specifically, the inter-application communication infrastructure may implement one metamodel (consistently used in the involved applications) to describe how an application could participate in an inter-application communication. The metamodel can describe the input parameters accepted but the application and the possible output of it. In typical mashup scenarios this is also called inputs/outputs of the respective application. Regardless, this metamodel often not only defines the pure existence of the input/output data, but also the structure (such as data types or the cardinality) and whether or not this data is mandatory (or optional) for the application's messaging. Based on the metadata, which would be exposed or otherwise available for involved applications, there is a protocol defining the communication flows between applications. In mashup scenarios, this can be called "the wiring" between applications. In other words, the metamodel of the applications and the protocol help define the wiring of an application and allow a description of the needed inter application communication. Beyond the metamodel, there can also be a description of the system landscape (i.e. on which machine/technology stack/UI technology each involved application is running), which can be more easily referred to as the "communication model." The communication model may be executed by a communication runtime, which is implemented for involved application platforms. And the communication runtime is often part of a communication hub. As such, communication hubs can be connected between each other and could therefore ensure an optimized communication processing based on the current system landscape. In certain embodiments, the landscape aware inter-application communication infrastructure helps address demand to combine existing functionality/applications to new composed applications/scenarios. Put differently, as a business or other organization identifies a need to have more loosely coupled application landscape, there can be a corresponding desire for a flexible inter-application communication infrastructure, which is able to adopt the existing (heterogenous) system landscape.

The mentioned infrastructure for an inter-application communication could be used for many versions, instances, and types (e.g., event-based) of inter-application communication. According to the implementation, it could be used both as part of a JAVA stack, an ABAP stack, or other languages and combinations. One example implementation involve mashup scenarios, where applications (running potentially on different UI technologies) are connected in a way such that the combination behaves like a single application. The event-driven inter-application communication infrastructure could help realize the data-flow between the applications. In this example, if there is a mix between different machines and/or UI technologies, then the communication would no longer be necessarily executed solely on the client-side or the server-side according to the concrete wirings between the applications.

Turning to the illustrated embodiment, FIG. 1 illustrates an example system 100 that implements a landscape aware inter-application communication infrastructure. System 100 may be a distributed client/server system that spans one or more networks, such as network 112. In such implementations, data may be communicated or stored in an encrypted format using any standard or proprietary encryption algorithm. But system 100 may be in a dedicated enterprise environment—across a local area network or subnet—or any other suitable environment without departing from the scope of this disclosure. The system 100 may include or be communicably coupled with a server 102, one or more clients 104, and network 112.

Server 102 comprises an electronic computing device operable to receive, transmit, process, and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

The server 102 may include local memory 120. Memory 120 is any tangible computer-readable memory that may include any memory or database module taking the form of volatile or non-volatile memory including, without limitation, magnetic media, optical media, random access memory (RAM), read-only memory (ROM), removable media, or any other suitable local or remote memory component. Illustrated memory 120 may include, among other items, landscape aware inter-application communication infrastructure 130 and a plurality of applications 140, described in more detail below. Further, the memory 120 may include one or more operating environments 135. Memory 120 may also include other types of data, such as environment and/or application description data, application data for one or more applications, as well as data involving VPN applications or services, firewall policies, a security or access log, print or other reporting files, HyperText Markup Language (HTML) files or templates, related or unrelated software applications or sub-systems, and others. Consequently, memory 120 may also be considered a repository of data, such as a local data repository from one or more applications.

More specifically, application 140 is any application, program, module, process, or other software that is capable of using or facilitates usage of landscape aware inter-application communication infrastructure, which is itself software. Regardless of the particular implementation, "software" may include software, firmware, wired or programmed hardware, or any combination thereof embodied on tangible computer readable media. Indeed, form transformation module 130 may be written or described in any appropriate computer language including C, C++, Java, Visual Basic, assembler, Perl, any suitable version of 4GL, as well as others. For example, form transformation module 130 may be a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 140 is illustrated in FIG. 1 as a single module, application 140 may include numerous other sub-modules or may instead be a single multi-tasked module that implements the various features and functionality through various objects, methods, or other processes. Further, while illustrated as internal to server 102, one or more processes associated with application 140 may be stored, referenced, or executed remotely. For example, a portion of application 140 may be a web service that is remotely called, while another portion of application 140 may be an interface object bundled for processing at remote client 104. Moreover, application 140 may be a child or sub-module of another software module or enterprise application (not illustrated) without departing from the scope of this disclosure.

To utilize landscape aware inter-application communication infrastructure, a plurality of applications 140 are communicably coupled to each other, whether on the same computer or across network 112, through landscape aware inter-application communication infrastructure 130. This coupling may be accomplished, for example, using an HTTP connection or any other suitable communication channel operable to communicate messages in the desired format. Inter-application communication infrastructure 130 generally comprises an event-driven module that is capable of, at run-time, of identifying the communication structure for the targeted heterogeneous application and translating the message based on this identified structure. For example, inter-application communication infrastructure 130 may receive a message from a first heterogeneous application, with the message targeted for a second heterogeneous application. The inter-application communication infrastructure 130 then dynamically identifies a stored communication structure for the second heterogeneous application, where the communication structure is exposed by the second heterogeneous application. The inter-application communication infrastructure 130 translates the message into a message compatible with the second heterogeneous application based on this identified structure and communicates the translated message to the second heterogeneous application for processing.

According to some implementations, the communication structure 145 may be in the form of one or more eXtensible Markup Language (XML) documents files or portions or Structured Query Language ("SQL") statements or scripts of a scripting language, a script language, or an extension language. For example, the communication structure 145 may be formatted, stored, or defined as various data structures in text files, Virtual Storage Access Method (VSAM) files, flat files, Btrieve files, comma-separated-value (CSV) files, internal variables, or one or more libraries. Aside from XML, other example scripting languages may include JavaScript, Cascading Style Sheets (CSS), HTML, asynchronous JavaScript and XML (AJAX), as well as others. Regardless of the particular language or format, it will be understood that communication structure 145 may be a file tightly related to a particular application 140, a physically separate file exposed by the particular application 140, or a single file that is associated with landscape aware inter-application communication infrastructure 130 for a plurality of applications 140.

An example communication structure 145, shown below, is in the form of an XML script for a hypothetical domain, xyz.com. Specifically, a protocol used in such an infrastructure could be, for example, an XML-based one. For example, one XML portion of communication structure 145 that may send "commands" or other messages between applications may follow the below example format:

```
<?xml version="1.0" encoding="iso-8859-1"?>
    <ccp:CommandsIn
xmlns:ccp="http://www.xyz.com/namespaces/ccp">
        <ccp:Command name="FireInport">
            <ccp:Port name="airline">
                <atom:feed
xmlns:atom="http://www.w3.org/2005/Atom">
                    <atom:event>
                        <CARRID>
                        UA
                        </CARRID>
                    </atom:event>
                </atom:feed>
            </ccp:Port>
        </ccp:Command>
    </ccp:CommandsIn>
```

Here we forward a command "FireInport" and the concrete data of the inport is defined in a ATOM compatible format. The XML schema behind this is defining in the end the "Communication Model." Of course, it will be understood that the forgoing is for illustration purposes and is not meant to limit the scope of the disclosure. Put differently, the above example script is meant to help provide context and description and other scripts may implement functions and functionality disparate from it while remaining within the scope of the disclosure.

Server 102 may also include processor 125. Processor 125 executes instructions, such as the foregoing software, and manipulates data to perform the operations of the server 102 and may be, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes application 140 and inter-application communication infrastructure 130.

Server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least a portion of network 112 may facilitate communications between server 102 and at least one client 104. For example, server 102 may be communicably coupled to a repository through one sub-net while communicably coupled to a particular client 104 through another. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network accessible to users via certain local or remote clients 104.

Client 104 may be any computing device operable to connect or communicate with server 102 or network 112 using any communication link. At a high level, each client 104 includes or executes at least GUI 136 and comprises an electronic computing device operable to receive, transmit, process and store any appropriate data associated with system 100. It will be understood that there may be any number of clients 104 communicably coupled to server 102. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with an external or unsecured network. In another example, client 104 may comprise a laptop computer that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUIs or application interface 136.

GUI 136 comprises a graphical user interface operable to allow the user of client 104 to interface with at least a portion of system 100 for any suitable purpose, such as viewing application or other transaction data. For example, GUI 136 could present various views on business information that are has been communicated between heterogeneous applications 140 through the inter-application communication infrastructure 130. Generally, GUI 136 provides the particular user with an efficient and user-friendly presentation of data provided by or communicated within system 100. GUI 136 may comprise a plurality of customizable frames or views having interactive fields, pull-down lists, and buttons operated by the user. GUI 136 may also present a plurality of portals or dashboards. For example, GUI 136 may display a secure webpage that allows users to input and define search parameters for one or more modules. It should be understood that the term graphical user interface may be used in the singular or in the plural to describe one or more graphical user interfaces and each of the displays of a particular graphical user interface. Indeed, reference to GUI 136 may indicate a reference to the front-end or a component of application 130, as well as the particular interface accessible via client 104, as appropriate, without departing from the scope of this disclosure. Therefore, GUI 136 contemplates any graphical user interface, such as a generic web browser or touch screen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

Figure 2:
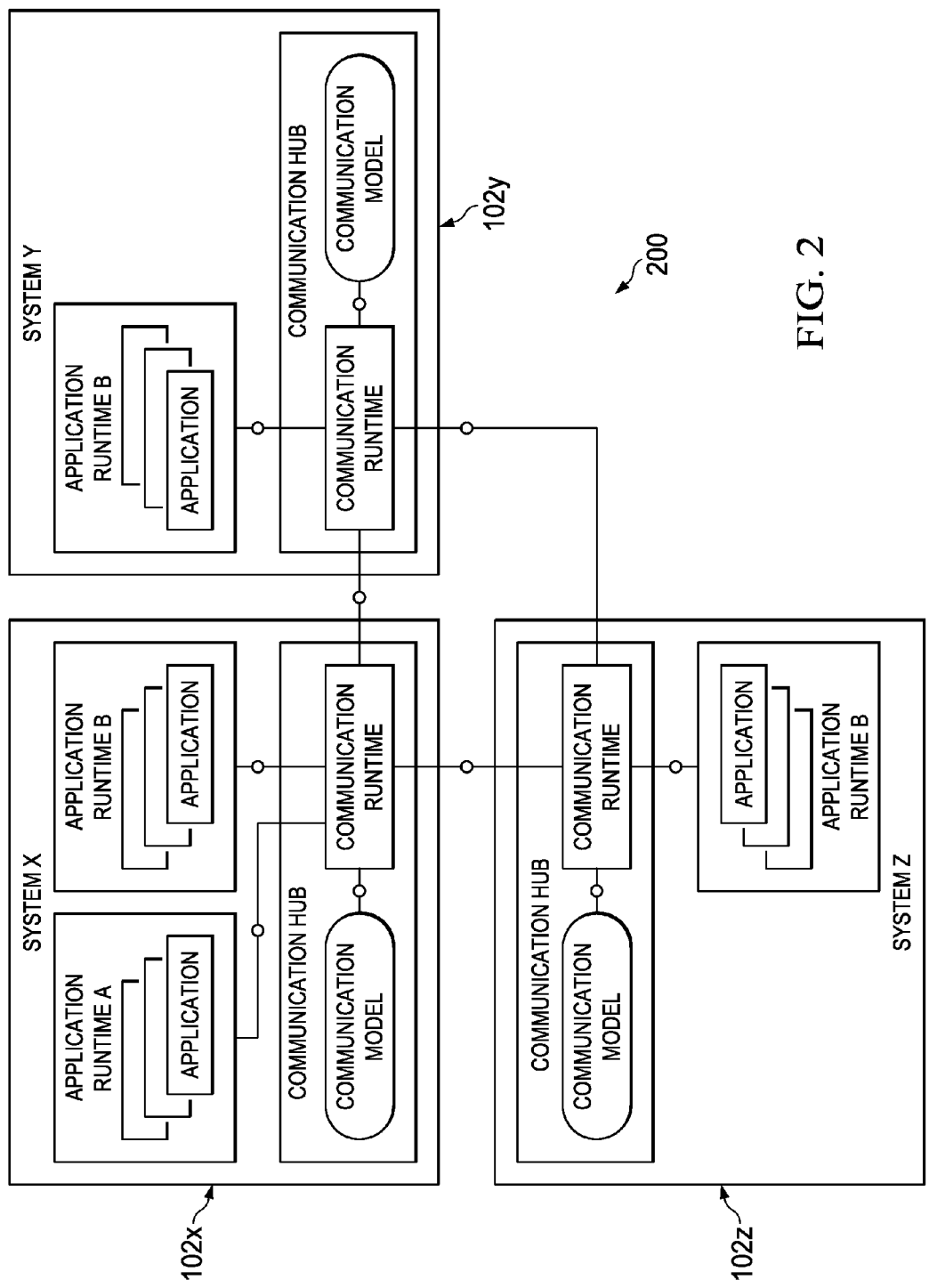
FIG. 2 is an example configuration of high level components in the system described in FIG. 1.

FIG. 2 is an example configuration 200 of high level components in the system 100. Specifically, FIG. 2 illustrates three example systems (X, Y, and Z) that are each executing one or more applications 140 within a respective application runtime. Further, each system is implementing a communications hub that includes (or is linked to) a communication runtime module and a communications model. In this implementation, other applications can be collected in a mashup scenario that more easily implements a dynamic data flow across differing runtimes. Instead of handling this data flow on the local system via remote calls, the data flow can be implemented (partially or wholly) by the remote system through the communication metamodel. In other words, local system may be aware of the remote heterogeneous applications via the communication infrastructure, which then allows the remote application to receive data messages in the desired protocol. A more detailed configuration is illustrated in FIGS. 3A and 3B, which illustrates an expanded mashup scenario 300 including wiring implementing the communications metamodel. For example, the ABAP may represent a back-end system 310 that includes CHIPs modules or applets. The communication metamodel allows the wiring to exist on either or both the frontend and the backend. In other words, the Java frontend 320 could be aware that one or a plurality of backend systems are executing an ABAP runtime, but not require "hardwired" links into the various components of the ABAP system. In this way, the ABAP system could more efficiently manage the messages and the data flow between ABAP applications or sub-modules, even though they are being generated by the Java system, which can greatly reduce roundtrips and increase performance.

Figures 4A, 4B:
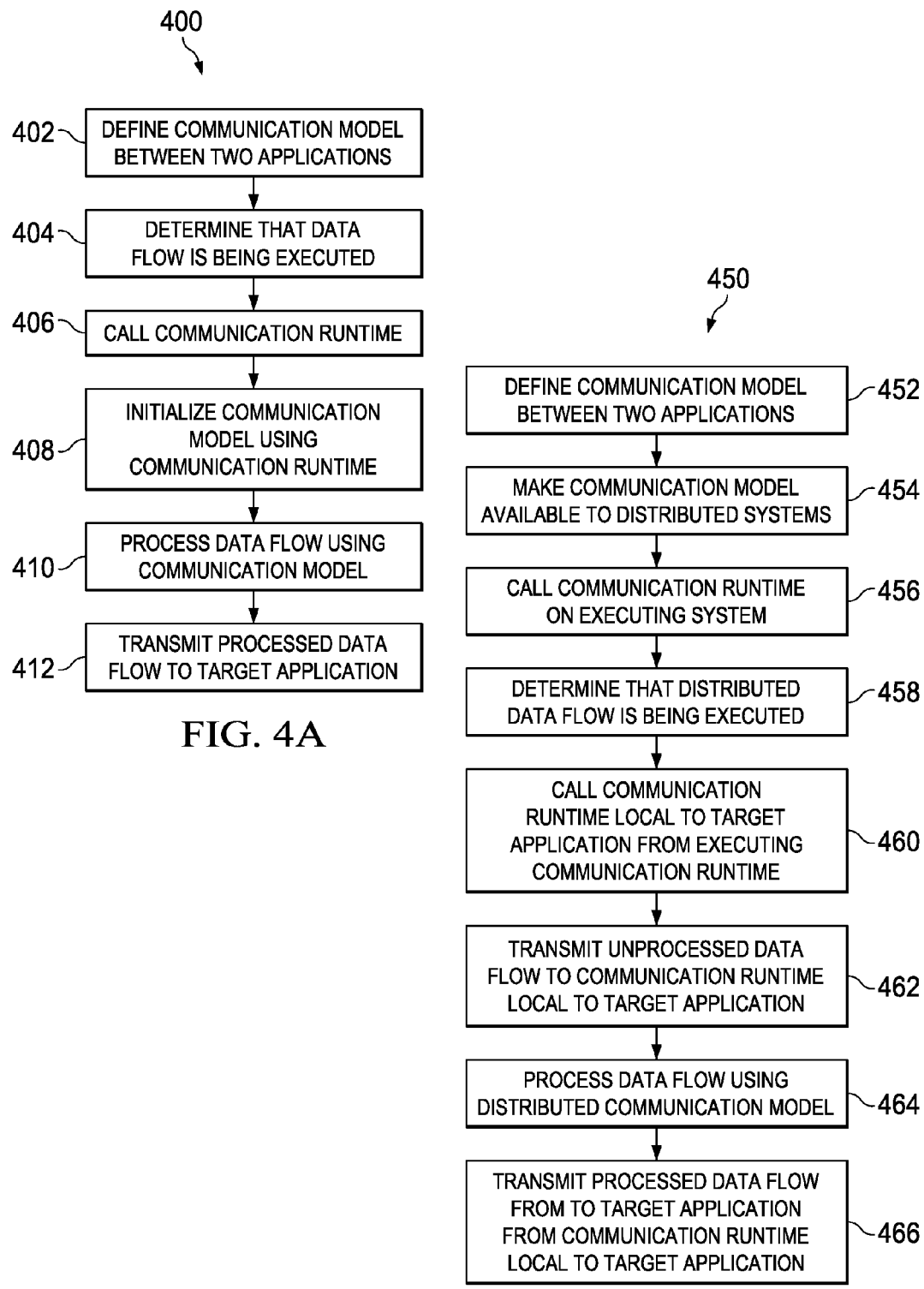
FIGS. 4A and 4B illustrate example flow charts for communicating data flows via a landscape aware inter-application communication infrastructure.

In one aspect of operation, FIG. 4A is a flowchart illustrating an example computer process 400 for communication between application A1 and application B1 in system X, such as the system described in FIG. 2. For clarity of presentation, the description that follows generally describes method 400 in the context of environment 200 illustrated in FIG. 2. However, it will be understood that method 400 may alternatively be performed by any other suitable system, environment, or combination of systems and environments as appropriate.

Illustrated method 400 begins at step 402 that enables this communication to be done in design time by defining the communication model (i.e. the appropriate meta-data). In this case, this communication model defines the data flow from application A1 to application B1. Although not illustrated, there could be any kind of data transformers involved in this flow such as, for example, to transform the address data exposed by A1 to latitude/longitude data needed by application B1.

At step 404, it is determined that the data flow is to be or being executed. This execution can be triggered by clicking a button in A1, changing the table selection in A1, or any other suitable runtime action. Then, at step 406, the communication runtime is called. Next, the communication runtime knows the defined communication model and checks if there is a outgoing data flow defined for A1 at step 408. For example, the target for the data flow could be application B1. At step 410, the communication runtime processes this data flow (including data transforming steps) and, at step 412, forwards the data in the end to the application runtime B (when appropriate). The application runtime B forwards this data to application B1 and the application B1 is updated with the new data.

In another aspect of operation, FIG. 4B is a flowchart illustrating an example computer process 450 for inter-application communication between applications running on different systems, such as the environment described in FIG. 2. For clarity of presentation, the description that follows generally describes method 450 in the context of environment 200 illustrated in FIG. 2. For example, using the environment illustrated in FIG. 2, there may be a three-step data flow defined from application B1 on system Y to application A1 on system X to application B2 on system X. However, it will be understood that method 450 may alternatively be performed by any other suitable system, environment, or combination of systems and environments as appropriate.

As with the process 400, the first illustrated step involves defining the meta data/communication model in design time at step 452. In this situation, to enable at runtime the optimized and system-landscape aware processing, this communication model should be made available to appropriate distributed system which are involved in the data flow at step 454. This availability could be achieved in any suitable manner, including replicating the data at design time to involved systems (i.e. to involved communication runtimes), using a central repository to store the communication model (such that the communication runtimes would access the communication model in this case via suitable remote calls), and storing the data one system and passing the data at runtime to systems involved in the data flow.

At example runtime, the data flow is started in application B1 on system Y (as in the simple example above by any kind of user interaction) at step 454. The application runtime B forwards this to communication runtime at step 456. The communication runtime checks the communication model and determines that the data flow is remote at step 458. Once determined, the communication runtime local to, or otherwise associated with, the target application is called so that it may be initiated if necessary at step 460. The current communication runtime forwards this at step 462 to the target communication runtime on system X. At step 464, the target communication runtime processes the data using the available communication model. As the communication model is also available on system X, the communication runtime on system X is able to process the two steps in the data flow (steps 464 and 466) without calling back to the leading communication runtime on system Y. As such, the data flow is processed across three applications running on two systems but in a way that remote calls are avoided if possible.

While the present disclosure uses a plurality of data and processing flows and accompanying descriptions to illustrate the example techniques associated with the various disclosed methods and techniques, system 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flows may take place simultaneously and/or in different orders than as shown and described. Moreover, system 100 may use processes and methods with additional, fewer, and/or different steps, so long as the processes and methods remain appropriate. In short, although this disclosure has been described in terms of certain implementations and generally associated methods, alterations and permutations of these implementations and methods will be apparent to those skilled in the art. Accordingly, other implementations are within the scope of the following claims.

What is claimed is:

1. A computer-implemented method, comprising:
    starting a data flow on a source computer system of a plurality of computer systems remote and different from a target computer system of the plurality of computer systems executing a heterogeneous application, the data flow used to transmit data to the heterogeneous application;
    determining, on the source computer system, and based on a design-time-defined communication metamodel available to the plurality of computer systems, that the data flow to the heterogeneous application is remote;
    generating an unprocessed message targeted to the heterogeneous application using, at least in part, the data associated with the data flow;
    based, at least in part, on the determination that the data flow is remote, communicating the message to an event-driven inter-application communication infrastructure for subsequent transmission to the heterogeneous application, wherein the event-driven inter-application communication infrastructure is divided into a plurality of communication hubs, at least one communication hub installed on each of the plurality of computer systems, each communication hub capable of identifying a communication structure for the heterogeneous application using the design-time-defined communication metamodel, wherein the communication structure is exposed by the heterogeneous application, and wherein a communication hub on the source computer system transmits the message in an unprocessed state to a communication hub on the target computer system;
    processing, using the communication hub on the target computer system and the identified communication structure, the message into a message compatible with the heterogeneous application; and
    transmitting the processed message from the communication hub on the target computer system to the heterogeneous application.

2. The computer implemented method of claim 1, the communication structure storing available inputs and outputs for the heterogeneous application.

3. The computer implemented method of claim 1, the communication structure storing available in ports and out ports for the heterogeneous application.

4. The computer implemented method of claim 1, the communication structure comprising an exposed file separated from the heterogeneous application.

5. The computer implemented method of claim 4, the exposed file comprising an XML file.

6. The computer implemented method of claim 1, the communication structure storing data type, cardinality, and an indication of whether data is mandatory or optional for each parameter of a particular message.

7. A computer program product, comprising a tangible, non-transitory, computer-readable storage medium storing computer-readable instructions operable when executed to:
    start a data flow on a source computer system of a plurality of computer systems remote and different from a target computer system of the plurality of computer systems executing a heterogeneous application, the data flow used to transmit data to the heterogeneous application;
    determine, on the source computer system, and based on a design-time-defined communication metamodel available to the plurality of computer systems, that the data flow to the heterogeneous application is remote;
    generate an unprocessed message targeted to the heterogeneous application using, at least in part, the data associated with the data flow;
    based, at least in part, on the determination that the data flow is remote, communicate the message to an event-driven inter-application communication infrastructure for subsequent transmission to the heterogeneous application, wherein the event-driven inter-application communication infrastructure is divided into a plurality of communication hubs, at least one communication hub installed on each of the plurality of computer systems, each communication hub capable of identifying a communication structure for the heterogeneous application using the design-time-defined communication metamodel, wherein the communication structure is exposed by the heterogeneous application, and wherein a communication hub on the source computer system transmits the message in an unprocessed state to a communication hub on the target computer system;
    process, using the communication hub on the target computer system and the identified communication structure, the message into a message compatible with the heterogeneous application; and transmit the processed message from the communication hub on the target computer system to the heterogeneous application.

8. The computer program product of claim 7, the communication structure storing available inputs and outputs for the heterogeneous application.

9. The computer program product of claim 7, the communication structure storing available in ports and out ports for the heterogeneous application.

10. The computer program product of claim 7, the communication structure comprising an exposed file separated from the heterogeneous application.

11. The computer program product of claim 10, the exposed file comprising an XML file.

12. The computer program product of claim 7, the communication structure storing data type, cardinality, and an indication of whether data is mandatory or optional for each parameter of a particular message.

13. The computer program product of claim 7, the inter-application communication infrastructure and the heterogeneous application each executing on distinct processors within disparate operating environments.

14. A computer system, comprising:
at least one hardware processor interoperable coupled to a computer memory and operable to:
start a data flow from a first heterogenous application on a source computer system of a plurality of computer systems remote from and different from a target computer system of the plurality of computer systems executing a second heterogeneous application, the data flow used to transmit data to the second heterogeneous application;
determine, on the source computer system, and based on a design-time-defined communication metamodel available to the plurality of computer systems, that the data flow to the second heterogeneous application is remote;
generate an unprocessed message targeted to the second heterogeneous application using, at least in part, the data associated with the data flow;
based, at least in part, on the determination that the data flow is remote, communicate the message to an event-driven inter-application communication infrastructure for subsequent transmission to the second heterogeneous application, wherein the event-driven inter-application communication infrastructure is divided into a plurality of communication hubs, at least one communication hub installed on each of the plurality of computer systems, each communication hub capable of identifying a communication structure for the heterogeneous application using the design-time-defined communication metamodel, wherein the communication structure is exposed by the second heterogeneous application, and wherein a communication hub on the source computer system transmits the message in an unprocessed state to a communication hub on the target computer system;
process, using the communication hub on the target computer system and the identified communication structure, the message into a message compatible with the second heterogeneous application; and
transmit the processed message from the communication hub on the target computer system to the second heterogeneous application.

15. The computer system of claim 14, the communication structure storing available inputs and outputs for the heterogeneous application.

16. The computer system of claim 14, the communication structure storing available in ports and out ports for the heterogeneous application.

17. The computer system of claim 14, the communication structure comprising an exposed file separated from the heterogeneous application.

18. The computer system of claim 14, the communication structure storing data type, cardinality, and an indication of whether data is mandatory or optional for each parameter of a particular message.

19. The computer system of claim 14, the first heterogeneous application and the second heterogeneous application executing on distinct processors within disparate operating environments.

20. The computer system of claim 14, the first heterogeneous application and the second heterogeneous application based on disparate computer programming languages, each utilizing a distinct message structure.

* * * * *